United States Patent
Hansmann et al.

(10) Patent No.: US 11,683,283 B2
(45) Date of Patent: Jun. 20, 2023

(54) METHOD FOR ELECTRONIC MESSAGING

(71) Applicant: INTERNATIONAL BUSINESS MACHINES CORPORATION, Armonk, NY (US)

(72) Inventors: Uwe Karl Hansmann, Tuebingen (DE); Thomas Stober, Herrenberg (DE); Timo Kussmaul, Boeblingen (DE); Vijay Ekambaram, Chennai (IN); Sneha Mondal, Bangalore (IN); Smitkumar Narotambhai Marvaniya, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 191 days.

(21) Appl. No.: 17/216,956

(22) Filed: Mar. 30, 2021

(65) Prior Publication Data

US 2022/0321511 A1     Oct. 6, 2022

(51) Int. Cl.
*H04L 51/046* (2022.01)
*H04L 51/02* (2022.01)
*G06N 20/00* (2019.01)
*G06Q 30/016* (2023.01)
*G06F 40/30* (2020.01)

(52) U.S. Cl.
CPC .......... *H04L 51/046* (2013.01); *G06F 40/30* (2020.01); *G06N 20/00* (2019.01); *G06Q 30/016* (2013.01); *H04L 51/02* (2013.01)

(58) Field of Classification Search
CPC ....... H04L 51/046; H04L 51/02; G06F 40/30; G06N 20/00; G06Q 30/016
See application file for complete search history.

(56) References Cited

U.S. PATENT DOCUMENTS

| | | | |
|---|---|---|---|
| 7,783,486 B2 | 8/2010 | Rosser |
| 8,818,926 B2 | 8/2014 | Wallace |
| 9,369,410 B2 | 6/2016 | Capper |
| 10,026,400 B2 | 7/2018 | Gelfenbeyn |
| 10,170,106 B2 | 1/2019 | Gelfenbeyn |
| 10,482,184 B2 | 11/2019 | Gelfenbeyn |

(Continued)

FOREIGN PATENT DOCUMENTS

| | | |
|---|---|---|
| CN | 109033223 A | 12/2018 |
| CN | 110110062 A | 8/2019 |

(Continued)

OTHER PUBLICATIONS

International Searching Authority, "Notification of Transmittal of the International Search Report and the Written Opinion of the International Searching Authority, or Declaration," Patent Cooperation Treaty, dated May 26, 2022, 10 pages, International Application No. PCT/CN2022/079755.

(Continued)

*Primary Examiner* — Caroline H Jahnige
(74) *Attorney, Agent, or Firm* — Teddi E. Maranzano

(57) ABSTRACT

The present disclosure relates to a method comprising receiving an electronic message. Message intents of the received electronic message and one or more related intents may be determined. An electronic message may be generated according to a selected subset of the message intents or according to the related intents. The generated electronic message may be provided.

14 Claims, 11 Drawing Sheets

(56) References Cited

U.S. PATENT DOCUMENTS

| | | | |
|---|---|---|---|
| 10,546,067 B2 | 1/2020 | Gelfenbeyn | |
| 10,553,214 B2 | 2/2020 | Aleksic | |
| 11,502,976 B1* | 11/2022 | Derza | G06N 20/00 |
| 11,533,279 B2 | 12/2022 | Hansmann | |
| 2005/0105712 A1* | 5/2005 | Williams | G10L 13/027 |
| | | | 704/275 |
| 2011/0125734 A1 | 5/2011 | Duboue | |
| 2015/0172242 A1 | 6/2015 | Goncalves | |
| 2017/0178529 A1 | 6/2017 | Chetlur | |
| 2017/0259177 A1 | 9/2017 | Aghdaie | |
| 2017/0357896 A1 | 12/2017 | Tsatsin | |
| 2018/0181592 A1 | 6/2018 | Chen | |
| 2018/0204314 A1 | 7/2018 | Kaplanyan | |
| 2019/0109802 A1 | 4/2019 | Akkiraju | |
| 2019/0212879 A1* | 7/2019 | Anand | G06Q 50/10 |
| 2019/0230058 A1 | 7/2019 | Turfan | |
| 2019/0251859 A1 | 8/2019 | Anbang | |
| 2019/0272316 A1* | 9/2019 | Ben Ami | G06F 40/30 |
| 2019/0377790 A1* | 12/2019 | Redmond | G06F 40/35 |
| 2020/0005117 A1* | 1/2020 | Yuan | G06F 40/30 |
| 2020/0098366 A1 | 3/2020 | Chakraborty | |
| 2020/0111377 A1 | 4/2020 | Truong | |
| 2020/0151254 A1* | 5/2020 | Wohlwend | G10L 15/16 |
| 2020/0202194 A1 | 6/2020 | Wu | |
| 2020/0226288 A1 | 7/2020 | Zhang | |
| 2020/0320116 A1 | 10/2020 | Wu | |
| 2020/0327327 A1 | 10/2020 | Wu | |
| 2020/0358732 A1 | 11/2020 | Raviv | |
| 2020/0387804 A1 | 12/2020 | Mathur | |
| 2020/0410335 A1 | 12/2020 | Gu | |
| 2021/0058355 A1 | 2/2021 | Dawes | |
| 2021/0089903 A1 | 3/2021 | Murray | |
| 2022/0321508 A1 | 10/2022 | Hansmann | |

FOREIGN PATENT DOCUMENTS

| | | |
|---|---|---|
| CN | 110602311 A | 12/2019 |
| CN | 112241468 A | 1/2021 |
| WO | 2022206307 A1 | 10/2022 |
| WO | 2022206311 A1 | 10/2022 |

OTHER PUBLICATIONS

Ashktorab, et al., "Resilient Chatbots: Repair Strategy Preferences for Conversational Breakdowns", CHI 2019 [paper], May 4-9, 2019, 12 pages, Glasgow, SCT, UK.

Devlin, et al., "Bert: Pre-training of Deep Bidirectional Transformers for Language Understanding", Google AI Language, May 24, 2019, 16 pages, arXiv:1810.04805v2.

Disclosed Anonymously, "Chatbot Development: Building Bots with Wit.ai," Discover.bot, Jul. 16, 2019 [accessed on Aug. 3, 2020], 6 pages, Retrieved from the Internet: <URL: https://discover.bot/bot-talk/guide-to-bot-buiding-frameworks/wit-ai/>.

Google Cloud, "Dialogflow basics," Dialogflow Documentation, [Retrieved on Mar. 23, 2021], 10 pages, Retrieved from the Internet: <URL: file:///C:/Users/ERIKAF~1/AppData/Local/Temp/NPL%20-%20Dialogflow%20basics%20Dialogflow%20Documentation%20Google%20Cloud.htm>.

Weston, et al., "Towards AI-Complete Question Answering: A Set of Prerequisite Toy Tasks", Facebook AI Research, Dec. 31, 2015, 14 pages, arXiv:1502.05698v10.

International Searching Authority, "Notification of Transmittal of the International Search Report and the Written Opinion of the International Searching Authority, or Declaration," Patent Cooperation Treaty, May 26, 2022, 10 pages, International Application No. PCT/CN2022/079742.

IBM: List of IBM Patents or Patent Applications Treated as Related (Appendix P), Mar. 30, 2021, 2 pages.

Pending U.S. Appl. No. 17/301,244, entitled "Method for Electronic Messaging Using Image Based Noisy Content", Filed Date, 48 Pages.

Hansmann, et al., "Method for Electronic Messaging Using Image Based Noisy Content," Application and Drawings, Filed on Mar. 8, 2022, 45 Pages, Related PCT Patent Application Serial No. PCT/CN2022/079742.

Hansmann, et al., "Method for Electronic Messaging," Application and Drawings, Filed on Mar. 8, 2022, 16 Pages, Related PCT Patent Application Serial No. PCT/CN2022/079755.

* cited by examiner

METHOD FOR ELECTRONIC MESSAGING

BACKGROUND

The present invention relates to the field of digital computer systems, and more specifically, to an electronic messaging method.

An automatic training or testing of users or systems is today done with a pre-defined set of questions and answers. However, in the real world, information is not always provided in a simple and structured way. But contains a lot of ambiguity, noise or may only contain a subset of the needed information or even too much.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method comprising:

receiving an electronic message of an electronic communication system;

determining, using a knowledge base, message intents of the received electronic message and one or more related intents;

generating an electronic message according to a selected subset of the message intents or according to the related intents;

controlling the electronic communication system to provide the generated electronic message instead of the received electronic message or provide the generated electronic message in addition to the received electronic message.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system configured for:

receiving an electronic message;

determining, using a knowledge base, message intents of the received electronic message and one or more related intents;

generating an electronic message according to a selected subset of the message intents or according to the related intents;

providing the generated electronic message instead of the received electronic message or provide the generated electronic message in addition to the received electronic message.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1A:
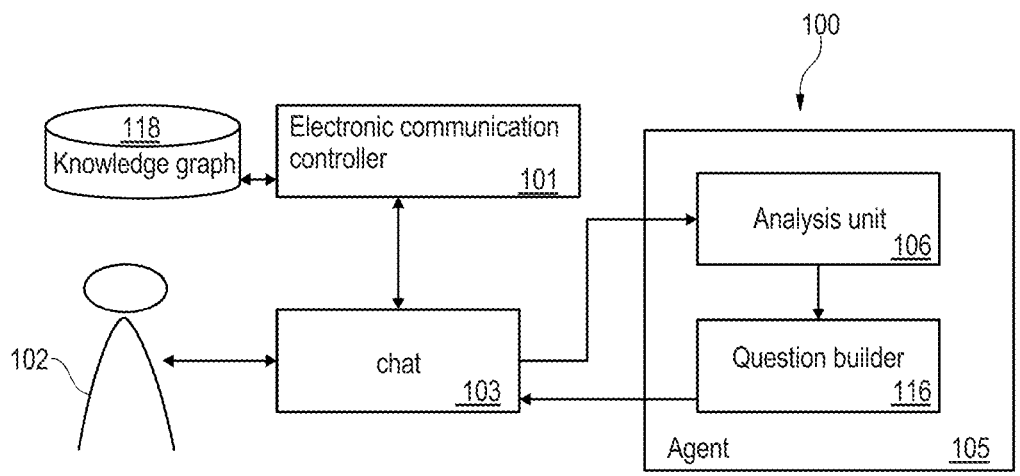
FIG. 1A illustrates a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Messaging may be a written communication sent over a variety of digital channels such as email, SMS and in-app chat. The messaging may be advantageous as it may provide relevant information at the right time. In particular, a messaging that is performed with the right information and frequency may increase the performance of the electronic communication system. Electronic messages may however be challenging to manage due to the proliferation of platforms, devices, and systems used to create these records. The present subject matter may be advantageous as it may provide a systematic way for controlling and managing the communication of electronic messages. This may particularly be advantageous, as in some agencies, the use of text and chat/instant messages may be critical to accomplishing the agency mission.

The electronic message may be received by, for example, reading a log of conversations in order to generate messages for a messaging session. In another example, the electronic message may be received by intercepting it e.g. during an ongoing messaging session. The intercepted electronic message may, for example, be provided during a messaging session. The messaging session may involve the exchange of electronic messages including text, multimedia, and/or voice in a real-time format or a non-real-time format. The real time format may involve instant messaging or chat and the non-real time format may involve email, posting to a dynamic forum or feed, etc. The messaging session may be associated with a context depending on use cases. For example, a messaging session may be performed between a chatbot agent and a user for training (a trainee) or testing the user by the chatbot agent. In this case, the electronic messages may be questions and answers. In another example, a messaging session may be performed between a plurality of users via a mobile messaging application provided on respective mobile client devices of the plurality of users. In another example, the messaging session can include a group chat via which the respective users share and discuss various topics including videos or other types of multimedia. The term "chatbot" or "chat bot" is a computer program designed to simulate a conversation with one or more human users via auditory or textual methods, primarily for engaging in small talk or for training. An aim of such simulation may be to fool the end-user into thinking that the program's output has been produced by a human.

The intercepted/received electronic message is processed in order to generate an electronic message. In case of a training use case, the electronic message may be generated to increase the level of difficulty of predefined questions by providing incomplete information, adding confusing intents to add ambiguity, and/or adding misleading intents to the intercepted/received electronic message. This may enable a reliable automatic training session. In case of a communication system where sensitive information should not be provided according to data access rules, the intercepted/received electronic message may be processed to identify intents that do not fulfill the data access rules in order to be masked or removed. This may enable a secure communication of data.

The present subject matter may be advantageous as it may make use of a knowledge base for accurately generating messages. The knowledge base may, for example, be a knowledge graph. The knowledge graph may represent one or more domain ontologies. For example, the knowledge graph may represent the domain of software and/or hardware bug fixing. In this case, the nodes of the knowledge graph may, for example, represent intents, images and resolutions. The intent may, for example, represent a specific software problem e.g. the intent may be #heating or #virus indicating a problem due to computer heating and presence of a computing virus respectively. The resolutions are associated with the problems defined in the intents of the knowledge graph e.g. a resolution associated with the intent #virus may be #install antivirus. The images may represent stack traces, error logs, function calls or command outputs. An image in the graph may, for example, be a screenshot of logs describing a problem related to one intent e.g. #fan_noise image may be associated with the intent #heating. However, the domain of the knowledge graph may be broad enough that it covers several topics. Following the example of the bug issues, several topics may be covered in the knowledge graph e.g. operating system issues may cover one topic, the display may cover another topic etc. The present subject matter may solve this issue by clustering the knowledge graph. The knowledge graph may be clustered, resulting in multiple clusters. A cluster may, for example, be represented by a subgraph of the knowledge graph, wherein data of the cluster represents a specific topic. The cluster may comprise sub-clusters, wherein a sub-cluster may represent, commonly occurring intents, commonly co-occurring intents, commonly suggested resolutions, not recommended or false resolutions etc.

The knowledge graph may be a graph. A graph may refer to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 toward node v2. A node of the graph may represent an entity. The entity may refer to a problem, resolution etc. The entity (and the corresponding node) may have one or more entity attributes or properties which may be assigned values. For example, the entity attributes of the resolution may comprise an attribute indicating whether the resolution is commonly suggested resolution or a not-recommended resolution etc. The attribute values that represent the node are values of the entity attributes of the entity represented by the node. The edge may be assigned one or more edge attribute values indicative of at least a relationship between the two nodes connected to the edge. The attribute values that represent the edge are values of the edge attributes. The relationship may, for example, comprise an inheritance (e.g. parent and child) relationship and/or associative relationship in accordance with a certain hierarchy. For example, the inheritance relationship between nodes v1 and v2 may be referred to as a "is-a relationship" between v1 and v2 e.g. "v2 is-a parent of v1". The associative relationship between nodes v1 and v2 may be referred to as a "has-a relationship" between v1 and v2 e.g. "v2 has a has-a relationship with v1" means that v1 is part or is a composition of or associated with v2.

According to one embodiment, the method further comprises: determining using the electronic message a context of the messaging session. The context of the messaging session is defined by at least a subgraph of the knowledge graph. The related intents may be determined using the subgraph such that the generated electronic message comprises a noisy content that is different from a content of the intercepted electronic message and that belongs to the same context. The intents named "related intents" may be used to add ambiguity or insert confusing information, while the selected subset of the message intents may be used to generate incomplete information. In other words, the content of the generated electronic message may provide the incomplete information, ambiguity or confusing information. The subset of message intents may be selected based on scores assigned to each of the message intents. The scores may be determined by an intent classifier. The intent classifier may be configured to receive as input the received electronic message and to provide the message intents in association with their scores. The subset of intents may be obtained by removing the first N ranked message intents of the message intents, where N>=1.

The context of the messaging session may be the topic of the messaging session. The topic of the messaging session may be determined by analysing the content of the electronic message. The analysis may, for example, be performed using a data mining technique. The subgraph of the knowledge graph may comprise intents that may be supposed to share the topic of the electronic message. The intents of the subgraph may comprise the message intents of the intercepted electronic message. The subgraph may advantageously be used as it may enable a ranking of the intents of the subgraph based on their importance e.g. using the centrality.

According to one embodiment, the electronic message is intercepted from a chat application of the electronic communication system. The chat application is configured to simulate a conversation with a user during the messaging session. The method comprises: intercepting the electronic message of the chat application at specific points of time of the messaging session.

The chat application may be used to conduct an on-line chat conversation via text or text-to-speech. For example, the chat application may be used for testing or training a user by asking questions to the user. The user may provide answers to the questions. The electronic message may, for example, comprise the text of a question. This embodiment may be advantageous as it may control the time at which the electronic messages, e.g. questions, need to be modified or adapted according to the present subject matter.

The points of time when to generate new/modified questions may, for example, be predefined or dynamically determined. For example, the points of time may dynamically be defined based on user inputs. This may, for example, enable to use different modes of operations of a conversation/training conducted with the user. For example, a simplified or difficult mode of training may be used. The simplified mode of training may only consider to modify a small portion of the questions (e.g. at the beginning of the conversation) while the difficult mode of operation may change a higher number of questions (e.g. at different stages of the conversation).

The generated electronic message may be modified by changing the intents of the intercepted electronic message. The change may be performed by removing intents of the intercepted electronic message in order to provide incomplete information, by adding confusing intents to add ambiguity, and/or by adding misleading intents to the intercepted electronic message.

According to one embodiment, the electronic communication system is a chat server that is configured to distribute messages between chat clients. For example, before distributing the electronic message, it is intercepted and processed according to the present subject matter.

According to one embodiment, the electronic message is received from a first chat client in destination to a second chat client. The method further comprises detecting sensitive information in the intercepted electronic message wherein the selected subset of the message intents comprises non-sensitive information, wherein the generated electronic message is provided instead of the intercepted electronic message. The sensitive information may, for example, comprise private information such as the full name etc.

According to one embodiment, the method further comprises selecting the subset of the message intents based on centrality indices of the knowledge graph such that the subset of message intents comprises K less important message intents, where K≥1.

According to one embodiment, the related intents are intents of the knowledge graph which are within k-hop neighbourhoods of the message intents, wherein k is a value of a configurable parameter.

According to one embodiment, the generated electronic message comprises a noisy content that is different from a content of the intercepted electronic message. The method further comprises configuring the value of the parameter in accordance with a desired noise level of the noisy content. The noise may, for example, be a user-based noise or issue-based noise. The user-based noise may, for example, be determined based on the user's property such as age etc. For example, the level of noise for an expert user may be provided higher than the level of noise for a normal user e.g. by increasing the value of the parameter k. The level of the issue-based noise may be changed by, for example, adding more confusing intents or removing more important intents.

According to one embodiment, the message intents represent technical problems. The method further comprises identifying resolutions associated with the message intents in the knowledge graph, identifying cooccurring intents which are cooccurring with the message intents in the knowledge graph, identifying resolutions associated with the cooccurring intents, ranking the resolutions of the cooccurring intents based on their similarities with the resolutions of the message intents, selecting a subset of the resolutions of the cooccurring intents having the R lowest similarities, wherein the related intents are the cooccurring intents associated with selected resolutions, where R>=1.

According to one embodiment, generating the electronic message according to the related intents comprises: applying a language model on the related intents for generating the electronic message. The language model may, for example, be a RNN—based language model, LSTM—based language model or GAN.

According to one embodiment, the method further comprises training the language model per persona of a user involved in the communication with the electronic communication system in order to mimic a user specific language. For example, the language model may be trained using sentences or texts that comprise intents which are user specific e.g. sentences of users having a certain age.

According to one embodiment, generating the electronic message according to the selected subset of intents comprises removing fragments of the intercepted electronic message one or more important intents, thereby generating the electronic message.

According to one embodiment, the method further comprises representing the intercepted electronic message in a predefined vector space, wherein the subset of intents is selected and the related intents are determined such that the generated electronic message is within a minimum distance from the intercepted electronic message in the vector space.

According to one embodiment, the method further comprises creating the knowledge graph using communication transcripts and/or logs of previous data communications, clustering intents of the knowledge graph according to one or more graph properties of the knowledge graph. The graph property comprises any one of: a centrality index of each node of the graph and a distance of each node to other nodes of the graph.

FIG. 1A is a diagram of a computer system 100 in accordance with an example of the present subject matter. The computer system 100 comprises an agent computer 105. The agent computer 105 may be an electronic communication system. The computer system 100 is provided with an electronic communication controller 101. The electronic communication controller 101 is connected to a chat link 103, to receive each successive message sent between a user 102 and the agent computer 105 during a conversation or chat session. The link 103 may connect the agent computer 105 to a remote user computer of the user 102 or may be a link to a display device of the agent computer 105. The link 103 may be set up over the Internet or other data channel. The link 103 may enable the conversation or chat to comprise a stream of text messages exchanged between user 102 and agent computer 105.

Successive messages of the user 102 are received at an analysis unit 106 of the agent computer 105. The analysis unit 106 performs the function of analysing a message, in order to determine the problem or inquiry of the user 102 which is the subject of the chat with the agent computer 105. If the message is in the form of text, the analysis unit 106 is provided with a text analytics capability, in order to carry out this function. The function of the analysis unit 106 may be part of a process for identifying a specific response that user 102 has provided in response to a question by the agent computer 105.

The agent computer 105 comprises a question builder 116 that receives inputs from the analysis unit 106. The question builder 116 uses these inputs (e.g. and a chatbot) to build or construct a request or question, wherein the request is a statement of a goal associated with a problem, and the user 102 needs to provide a solution to the problem. The question builder 116 may also generate a request without receiving any inputs from the analysis unit e.g. in order to initiate the conversation with the user 102. The message generated by the question builder 116 and/or the message received from the user 102 may be intercepted or provided as input to the electronic communication controller 101 via the link 103. The electronic communication controller 101 may use a knowledge graph 118 as a source of information for modifying the intercepted message according to the present subject matter.

Figure 1B:
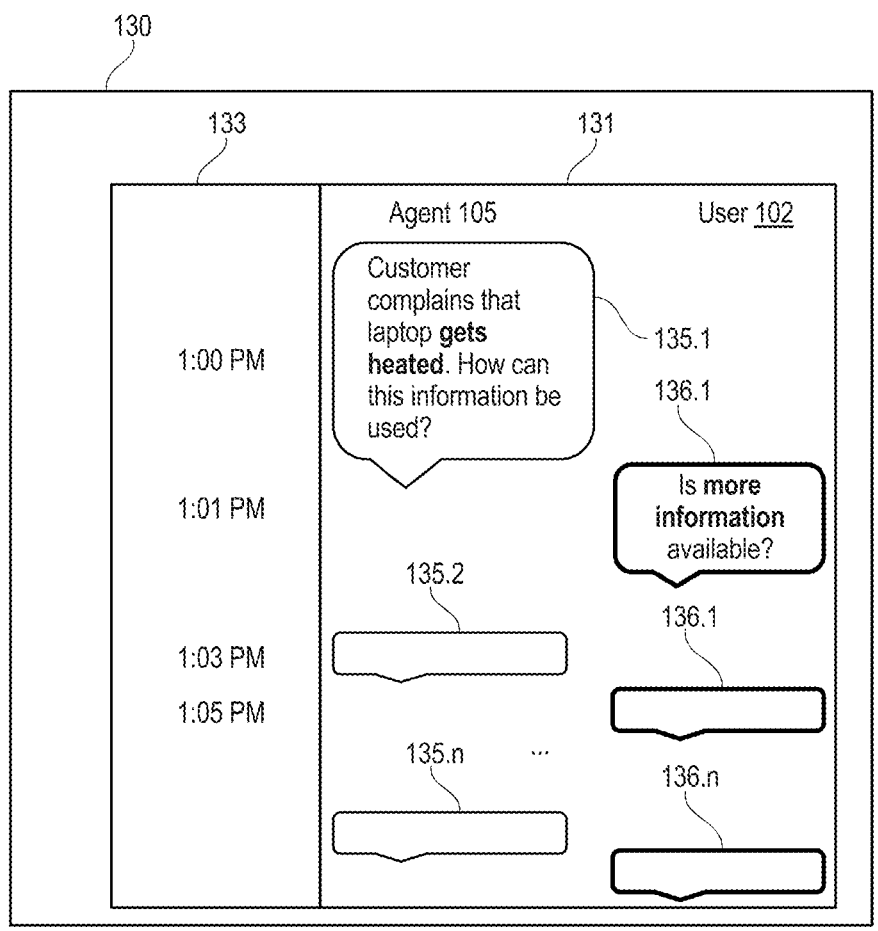
FIG. 1B depicts as window showing the transcript of a chat session.

The messages exchanged between the user 102 and the agent computer 105 may be displayed on a window 130 as shown in FIG. 1B. The window 130 may be displayed on a user interface of the agent computer 105 if the user 102 has a direct contact with the agent computer 105 or may be displayed on a remote user computer of the user 102.

FIG. 1B shows an example of a timeline view of chat messages between the user 102 and the agent computer 105. The window 130 showing the transcript of a chat session includes a first display region 131 for displaying the messages and a second display region 133 for displaying the timestamps of the chat messages. The messages are aligned with their respective timestamps. In the example shown in FIG. 1B, the agent computer 105 may provide messages 135.1 to 135.$n$, wherein each message may be a question to the user 102. The user 102 may provide corresponding response messages 136.1 to 136.$n$.

Although shown as separate components, the electronic communication controller 101 may, in another example, be part of the agent computer 105.

Figure 2:
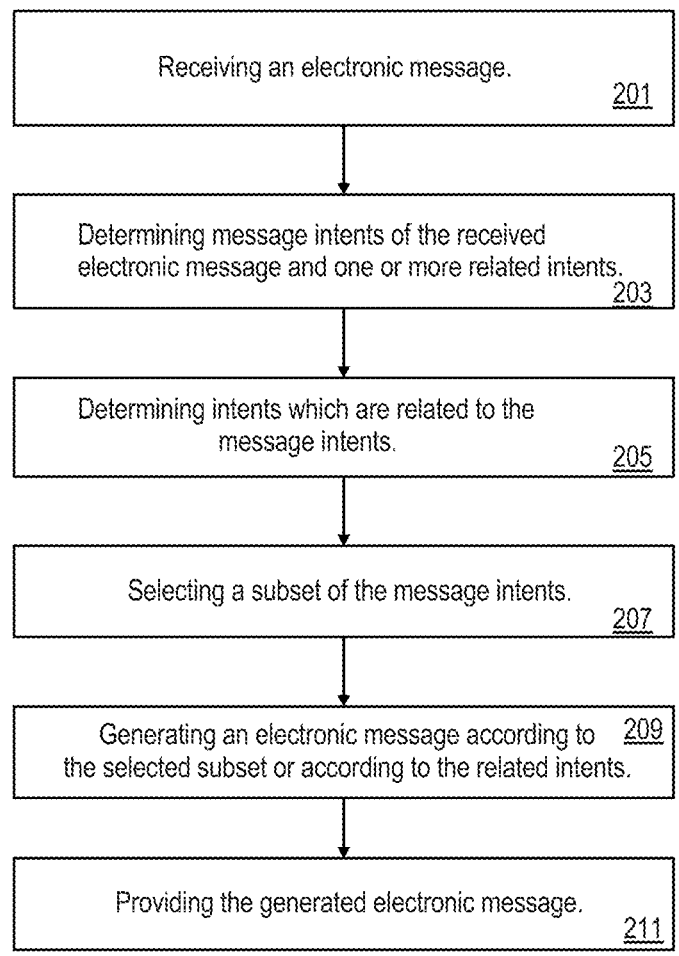
FIG. 2 is a flowchart of a method in accordance with an example of the present subject matter.

FIG. 2 is a flowchart of a method in accordance with an example of the present subject matter. For the purpose of explanation, the method described in FIG. 2 may be implemented in the system illustrated in FIG. 1A but is not limited to this implementation. The method of FIG. 2 may, for example, be performed by the electronic communication controller 101.

An electronic message may be received or identified at the electronic communication system 105 in step 201 being provided by the electronic communication system 105 e.g. to a user. The electronic message may be received or read from a log file of conversations or may be intercepted. The electronic message may, for example, be a message that is transmitted from a sending computer to a receiving computer which is the electronic communication system 105. The electronic message may, for example, be an outgoing message from a computer 105. In this case, the electronic communication controller 101 may be configured to intercept the electronic message before being transmitted from the computer 105. In another example, the electronic message may be an incoming message to the computer. In this case, the electronic communication controller may be configured to intercept the received electronic message before being provided to a receiving application of the computer. In another example, the electronic message may be a message produced by an application of a computer and displayed on an interface of the computer. In this case, the electronic communication controller may be configured to intercept the electronic message before being displayed. The electronic communication controller may or may not be part of the computer 105.

The electronic message may, for example, be any type of electronic communication data structure. The electronic message may, for example, be an electronic mail, instant message, audio message, or text message. The electronic message may be a message of a conversation. The electronic message may be one of chat messages of a conversation. The conversation may be a series of messages sent between a chat agent and one or more users. The electronic message may, for example, be the first chat message of the conversation or a randomly selected electronic message of the conversation. In another example, the electronic message may be a selected chat message of the conversation. The selection may be performed based on a selection criterion. The selection criterion may, for example, require that the message to be modified is received after a correct answer of the user.

Intents of the received or intercepted electronic message may be determined in step 203. The determined intents may be named message intents. The message intent may, for example, refer to the goal the chatbot agent has in mind when providing a question or comment. Intent classification may be the automated association of text to a specific purpose or goal. The message intents may, for example, be determined by a classifier. The classifier may analyse pieces of text and categorizes them into intents such as computing virus, heating etc. The intent classifier may, for example, use machine learning algorithms that can associate words or expressions with a particular intent.

Intents which are related to the message intents may be determined in step 205. The related intents may, for example, belong to the same domain of the message intents. A domain represents concepts or categories which belong to a part of the world, such as biology or politics. The domain typically models domain-specific definitions of terms. For example, a domain can refer to healthcare, advertising, commerce, medical and/or biomedical-specific field.

For example, a database of intents may be used to search for intents that are semantically related with the message intents. Those semantically related intents may be the related intents determined in step 205.

In another example, the related intents may advantageously be obtained using the knowledge graph. A consistent and accurate determination of related intents may be provided because the knowledge graph may have been used to determine the message intents. For example, the related intents may be intents of the knowledge graph which are within k-hop neighbourhood of the message intents, wherein k is a value of a configurable parameter.

A subset of the message intents may be selected in step 207. The subset of the message intents may, for example, be selected based on centrality indices of the knowledge graph such that the subset of message intents comprises m less important message intents, where m is a predefined number. In another example, the subset of m message intents may randomly be selected from the message intents of the intercepted electronic message. In another example, the subset of m message intents may be selected based on scores assigned to each of the message intents. The scores may be determined by the intent classifier. The intent classifier may be configured to receive as input the received electronic message and to provide the message intents in association with their scores. The subset of intents may be obtained by removing the first N ranked message intents of the message intents, where N>=1.

An electronic message may be generated in step 209 according to the selected subset of the message intents of step 207. Alternatively, the electronic message may be generated according to the related intents obtained in step 205.

The generation of the electronic message may, for example, be performed using machine learnings. For example, the domain represented by the intents may be used to generate the message from that intents. The domain may be associated with a graph learning-based model and/or a grammar-based model. The graph learning-based model and/or a grammar-based model may be used to generate the electronic message in step 209. The generated electronic message may have as intents the selected subset of intents or the related intents.

For example, the generation of the electronic message may be performed using a language model. The language model may, for example, be trained per persona of a user involved in the communication with the electronic communication system in order to mimic a user specific language.

The generated electronic message may be provided in step 211. In one example, the generated message may be provided instead of the intercepted electronic message. If, for example, the intercepted electronic message is to be displayed on the interface of the computer, the generated electronic message may be displayed instead of it. In another example, the generated electronic message may be provided in addition to the intercepted electronic message. If, for example, the intercepted electronic message is to be displayed on the interface of the computer, the generated electronic message may be displayed before or after (in a chat flow) displaying the intercepted electronic message.

The generated electronic message may be displayed in association with images of the knowledge graph which are associated with the intents from which the electronic message is generated.

After providing the generated electronic message, it may be determined if the user has identified the generated electronic message as a noise. If the user did not identify it as a noise the electronic communication controller may stop providing further noisy content in accordance with an easy mode of operation. In another example, the electronic communication controller may persist briefly to see if the user can eventually identify noise in the conversation according to a difficult mode of operation.

Figure 3A:
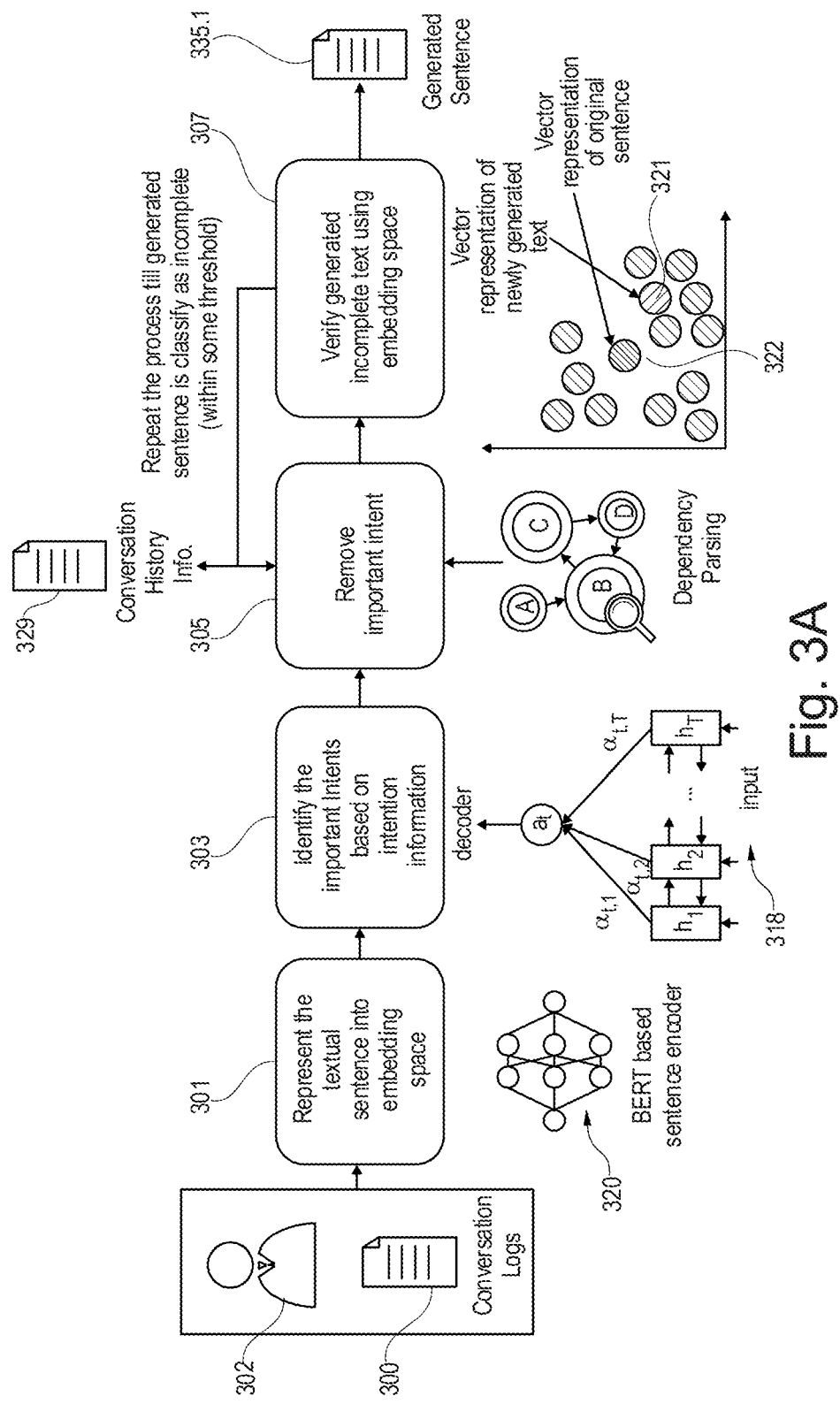
FIG. 3A is a flowchart of a method in accordance with an example of the present subject matter.

FIG. 3A is a flowchart of a method in accordance with an example of the present subject matter. For the purpose of explanation, the method described in FIG. 3A may be implemented in the system illustrated in FIG. 1A but is not limited to this implementation. The method of FIG. 3A may, for example, be performed by the electronic communication controller 101. The method of FIG. 3A may advantageously be used to generate messages having incomplete information compared to corresponding predefined messages.

Figure 3B:
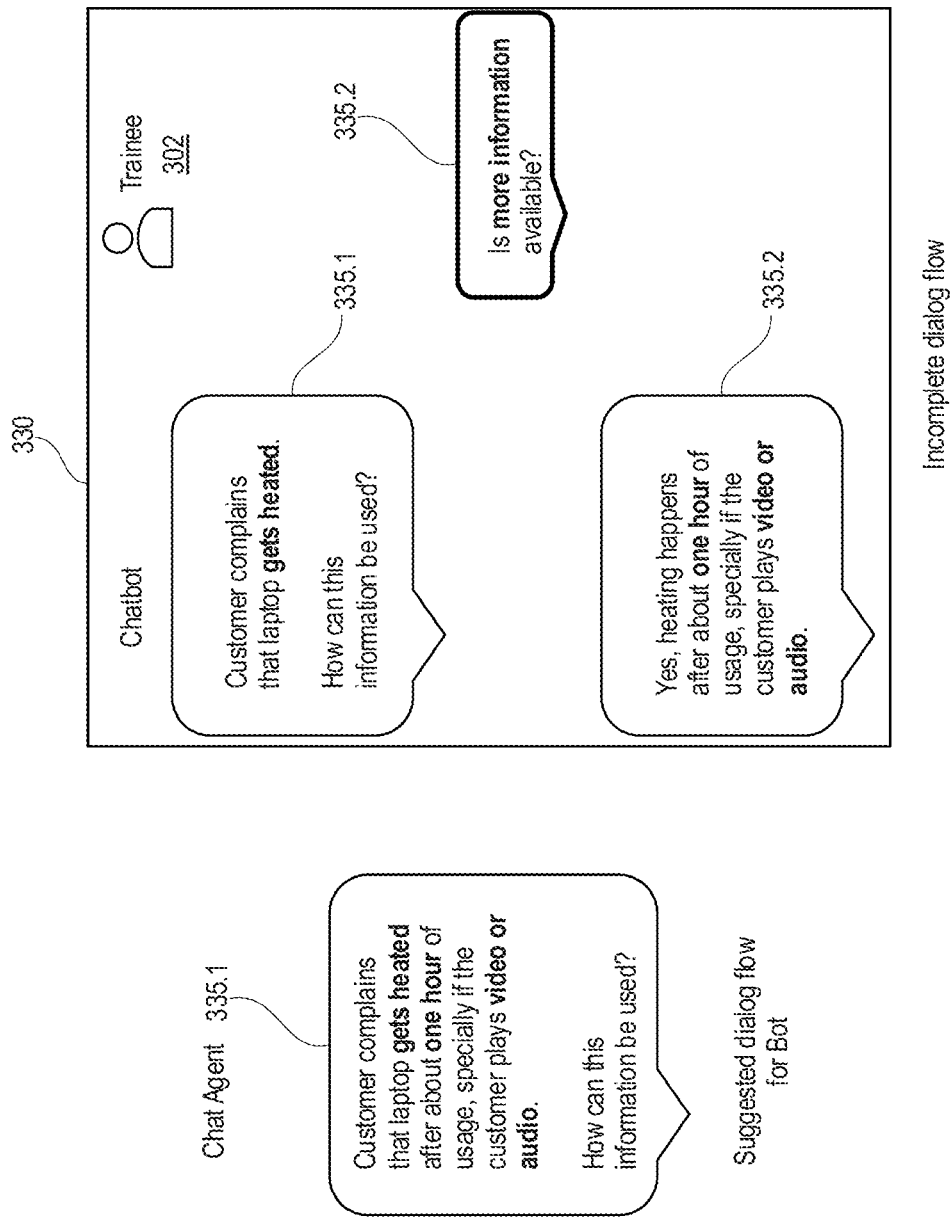
FIG. 3B depicts as window showing the transcript of a chat session.

An electronic message such as message 335.1 shown in FIG. 3B may be intercepted or received. For example, the received electronic message 335.1 may be one of messages received from of a conversation log 300 between a user 302 and a chat agent. In another example, the electronic message 335.1 may be intercepted e.g. in real-time. The electronic message 335.1 may have been prepared for submission by the chat agent and may be intercepted before it is displayed on the chat window 330. The electronic message 335.1 may or may not be associated with an image descriptive of the content of the electronic message 335.1. The electronic message 335.1 may be represented in step 301 into a predefined embedding space. This representation may, for example, be performed using a BERT based sentence encoder 320. In case an image is provided in association with the electronic message 335.1, a joint embedding space may be used to represent both the electronic message 335.1 and the associated image e.g. the joint embedding space is defined with reference to FIG. 7.

The important intents in the electronic message 335.1 may be identified in step 303 based on intention information using an intent predictor or classifier 318. The intent classifier 318 may receive as input the representations of the electronic message 335.1 and may provide intents of the electronic message, wherein each intent is associated with a score indicating its importance.

Figure 3C:
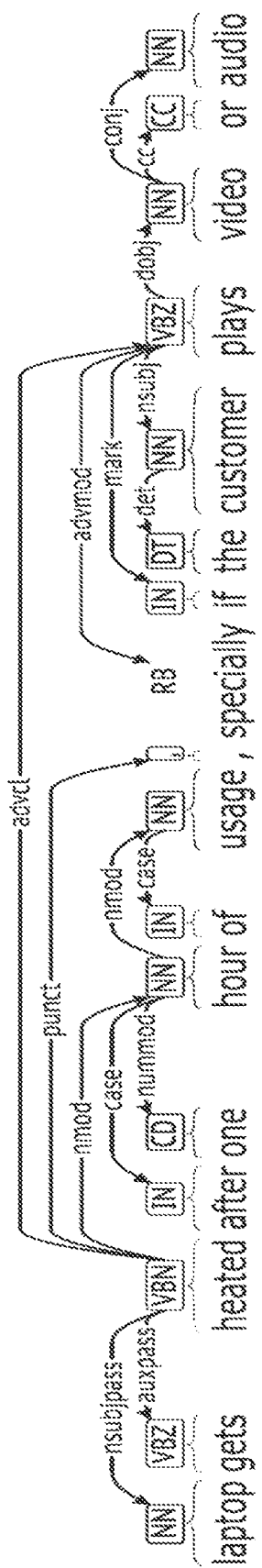
FIG. 3C depicts a representation of dependencies between words of an electronic message.

One or more important intents of the identified important intents may be removed in step 305 from the electronic message 335.1. As indicated in FIG. 3A, the intent to be removed may be determined using, for example, dependency parsing. FIG. 3C shows an example dependency representation of elements of the intercepted electronic message. This may result in an incomplete text. The generated incomplete text may be verified in step 307. This verification may be performed by representing the incomplete text in the embedding space e.g. by point 321 and comparing the representation 321 with the representation 322 of the intercepted electronic message 335.1 in the embedding space.

The verification of step 307 may indicate whether the message that results from the removal of the one or more important intents can be classified as incomplete based on the distance between the two points 321 and 322. If it cannot be classified as being incomplete, the intercepted electronic message 335.1 may be processed again in step 305 in order to remove new additional one or more important intents or to remove new different one or more important intents. These newly removed intents may be checked against a conversational history 329 in order to determine that they are important in the context of the messaging session. If it is classified as incomplete, the generated electronic message 335.1 may replace the one intercepted. This is indicated in FIG. 3B, where the generated electronic message 335.1 is displayed on the window 330 instead of the intercepted electronic message. As indicated in FIG. 3B, if the user is unable to respond to the question in the new generated message 335.1, the removed information may be put back in a following message 335.2 of the chat message. Following the example of FIG. 3B, three message intents "gets heated", "one hour" and "video or audio" may be identified. The two intents "one hour" and "video or audio" may be chosen as the most important ones. For example, from dependency parsing shown in FIG. 3C, it may be determined that the intents that have no dependent intents are the important ones. The text snippet containing intent "laptop gets heated" may be retained. The language model may be used to create new text snippet containing the other two intents.

Figure 4A:
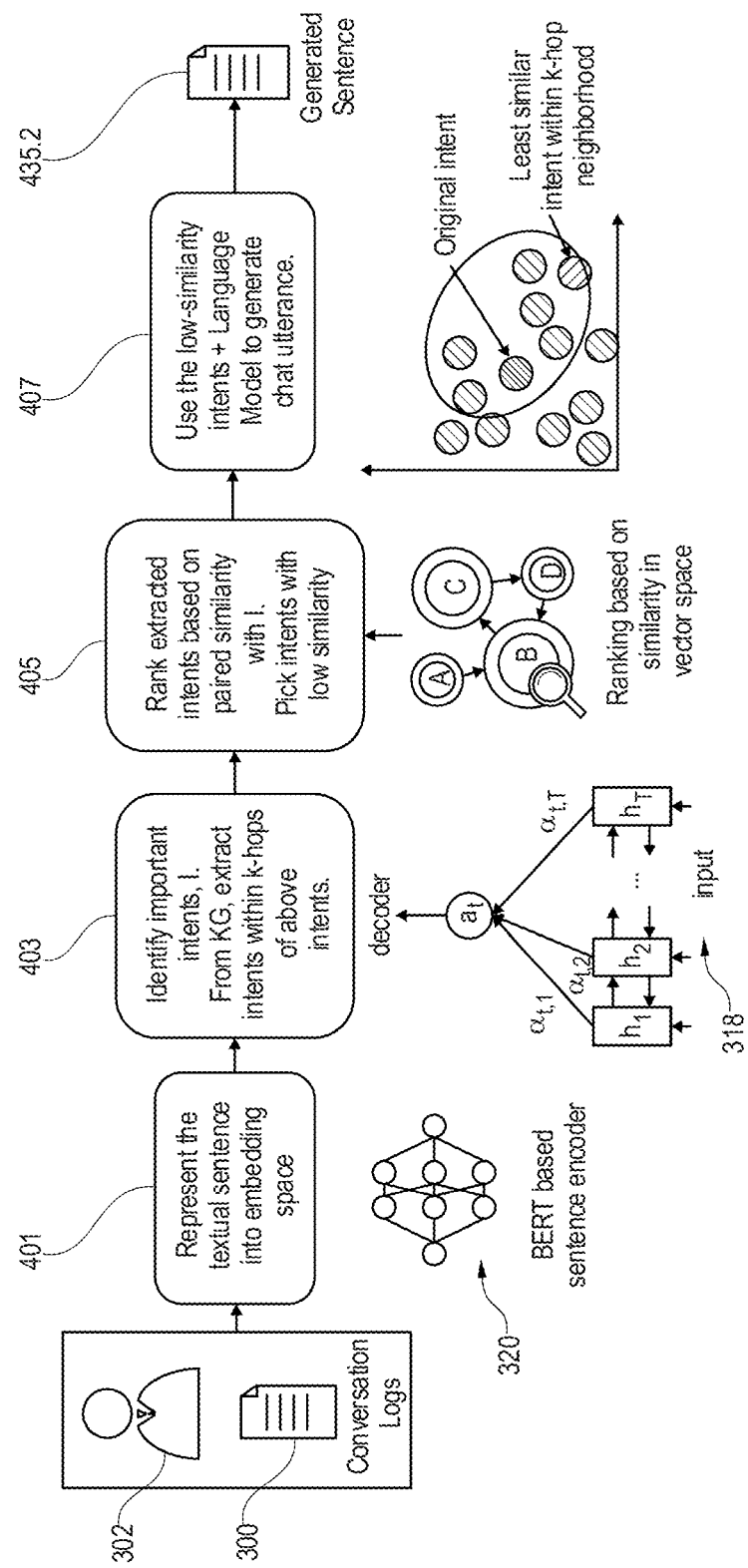
FIG. 4A is a flowchart of a method in accordance with an example of the present subject matter.

FIG. 4A is a flowchart of a method in accordance with an example of the present subject matter. For the purpose of explanation, the method described in FIG. 4A may be implemented in the system illustrated in FIG. 1A but is not limited to this implementation. The method of FIG. 4A may, for example, be performed by the electronic communication controller 101.

Figure 4B:
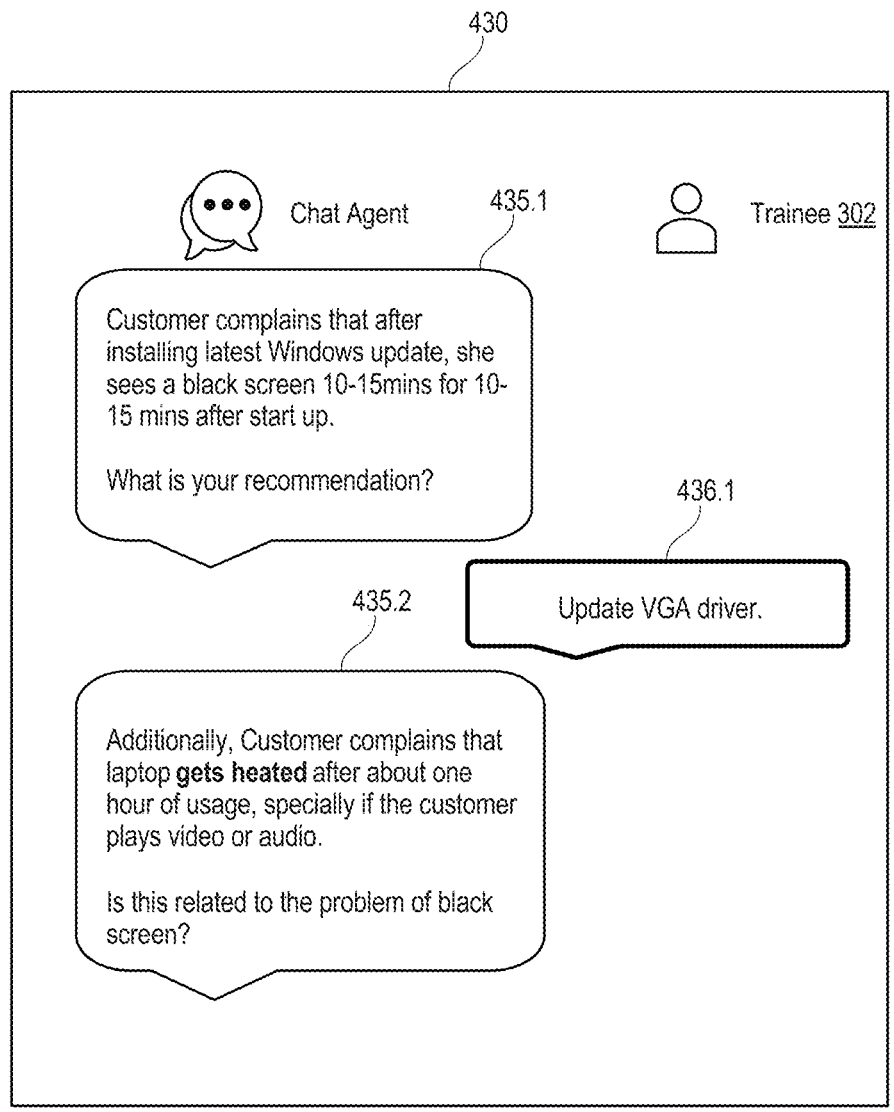
FIG. 4B depicts as window showing the transcript of a chat session.

An electronic message such as message 435.1 shown in FIG. 4B may be intercepted or received. The electronic message 435.1 may be one of messages of a conversation 300 between the user 302 and the chat agent. The electronic message 435.1 may have been prepared and displayed in the chat window 430 by the chat agent. The electronic message 435.1 may be represented in step 401 into a predefined embedding space e.g. as defined with reference to FIG. 7. This representation may be performed using the BERT based sentence encoder 320.

The important intents in the electronic message 435.1 may be identified in step 403 using the intent classifier 318. The important intents may form a set I. In order to ensure that "ambiguous" information is still contextual, a set of related intents I' that belong to k-hop neighbourhood of the set/in the knowledge graph may be determined in step 403. They are named related intents as they belong to the same context of the set of intents I. The set of related intent I' may be ranked in step 405 by similarity/co-occurrence with respect to the set/of important intents in the embedding space. The intents (named low-similarity intents) of the related intent set I' with lowest similarities may be selected in step 405. The low-similarity intents may be used to generate using a language model the chat utterance 435.2 shown in FIG. 4B.

Following the example of FIG. 4B, the original problem description provided in the electronic message 435.1 is the following "after installing latest Windows update, my HP laptop takes almost 10-15 mins to start up. I am getting a black screen for 10 mins after pressing Start button, only then the desktop appears. What to do?". The generated electronic message 435.2 may be used to introduce ambiguity in the chat flow because it inserts information which is not strongly related to the electronic message 435.1 but still belongs to the same context e.g. computer related issues.

Figure 5A:
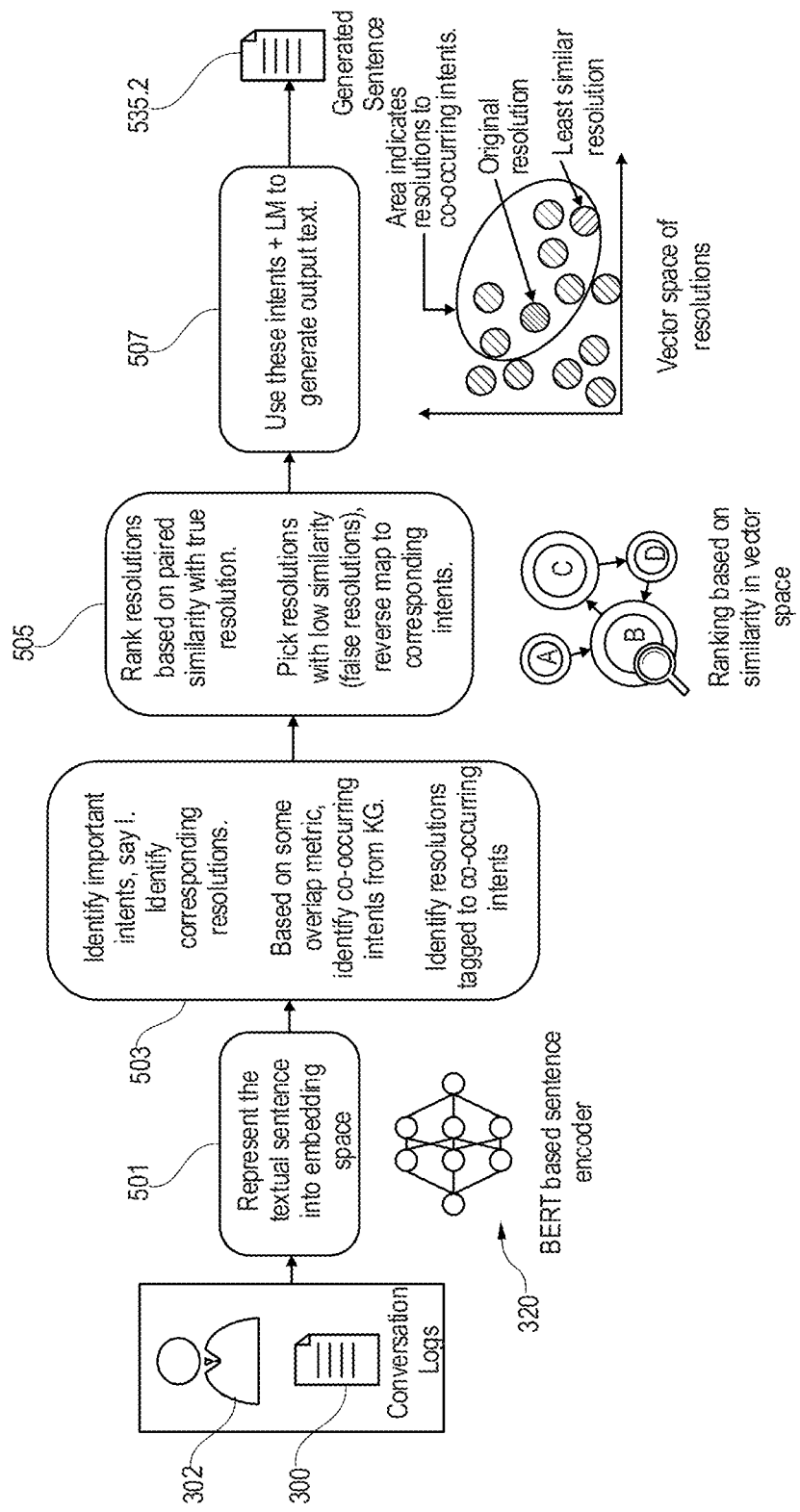
FIG. 5A is a flowchart of a method in accordance with an example of the present subject matter.

FIG. 5A is a flowchart of a method in accordance with an example of the present subject matter. For the purpose of explanation, the method described in FIG. 5A may be implemented in the system illustrated in FIG. 1A but is not limited to this implementation. The method of FIG. 5A may, for example, be performed by the electronic communication controller 101.

Figure 5B:
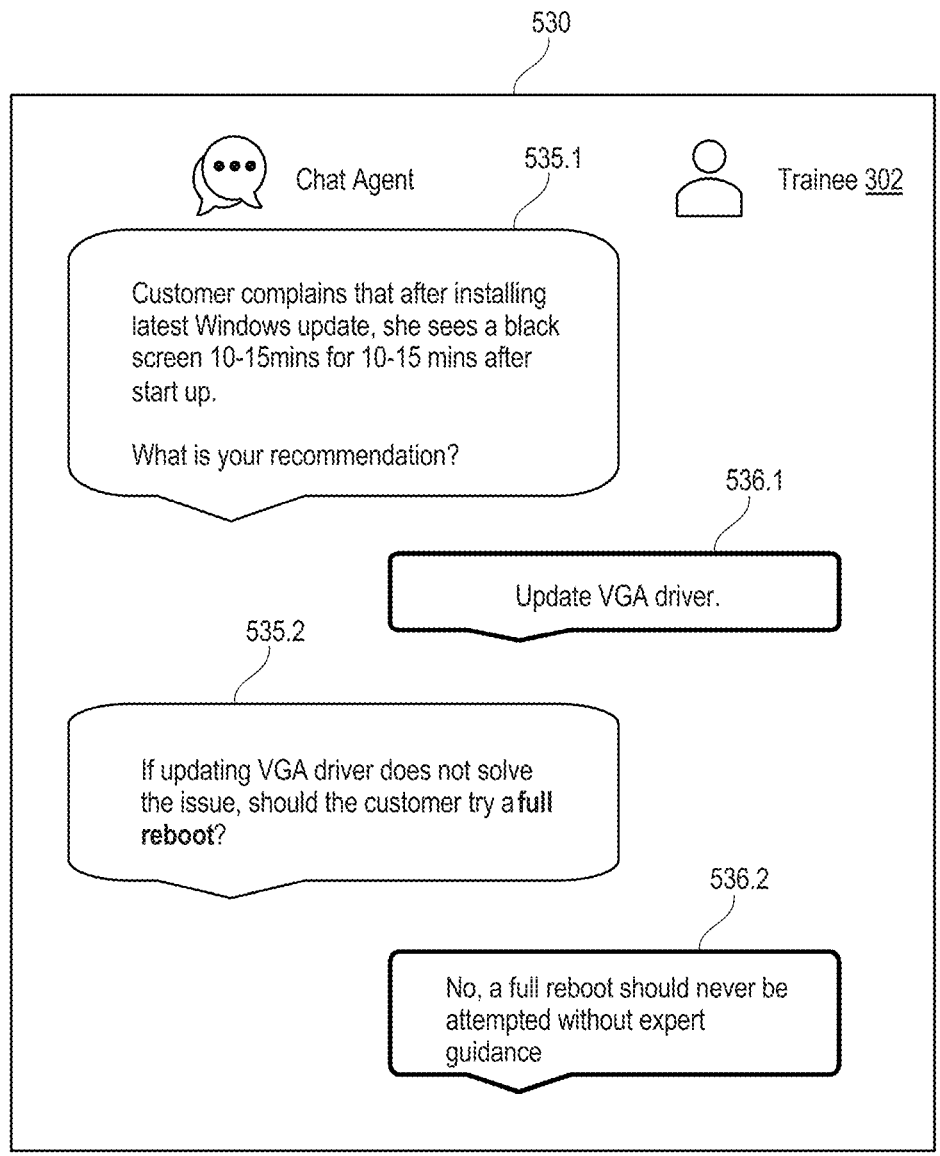
FIG. 5B depicts as window showing the transcript of a chat session.

An electronic message such as message 535.1 shown in FIG. 5B may be intercepted or received. The electronic message 535.1 may be one of messages of a conversation 300 between the user 302 and the chat agent. The electronic message 535.1 may have been prepared and displayed in the chat window 530 by the chat agent. The electronic message 535.1 may be represented in step 501 into a predefined embedding space e.g. as defined with reference to FIG. 7. This representation may be performed using the BERT based sentence encoder 320.

The important intents in the electronic message 535.1 may be identified in step 503 e.g. using the intent classifier. And the knowledge graph may be used to identify corresponding resolutions of the identified important intents. The important intents may form a set I and the resolutions may form a set R. A set of related intents I' that are cooccurring with the set I in the knowledge graph may be determined in step 403. Resolutions R' associated with the related intent set I' may be identified.

The set of related resolutions R' may be ranked in step 505 by similarity with respect to the set R of important resolutions in the embedding space. The resolutions of the related resolutions R' with lowest similarities may be selected in step 505. The low-similarity intents which are intents associated with the selected resolutions may be used to generate using a language model the chat utterance 535.2 shown in FIG. 5B.

Figure 6:
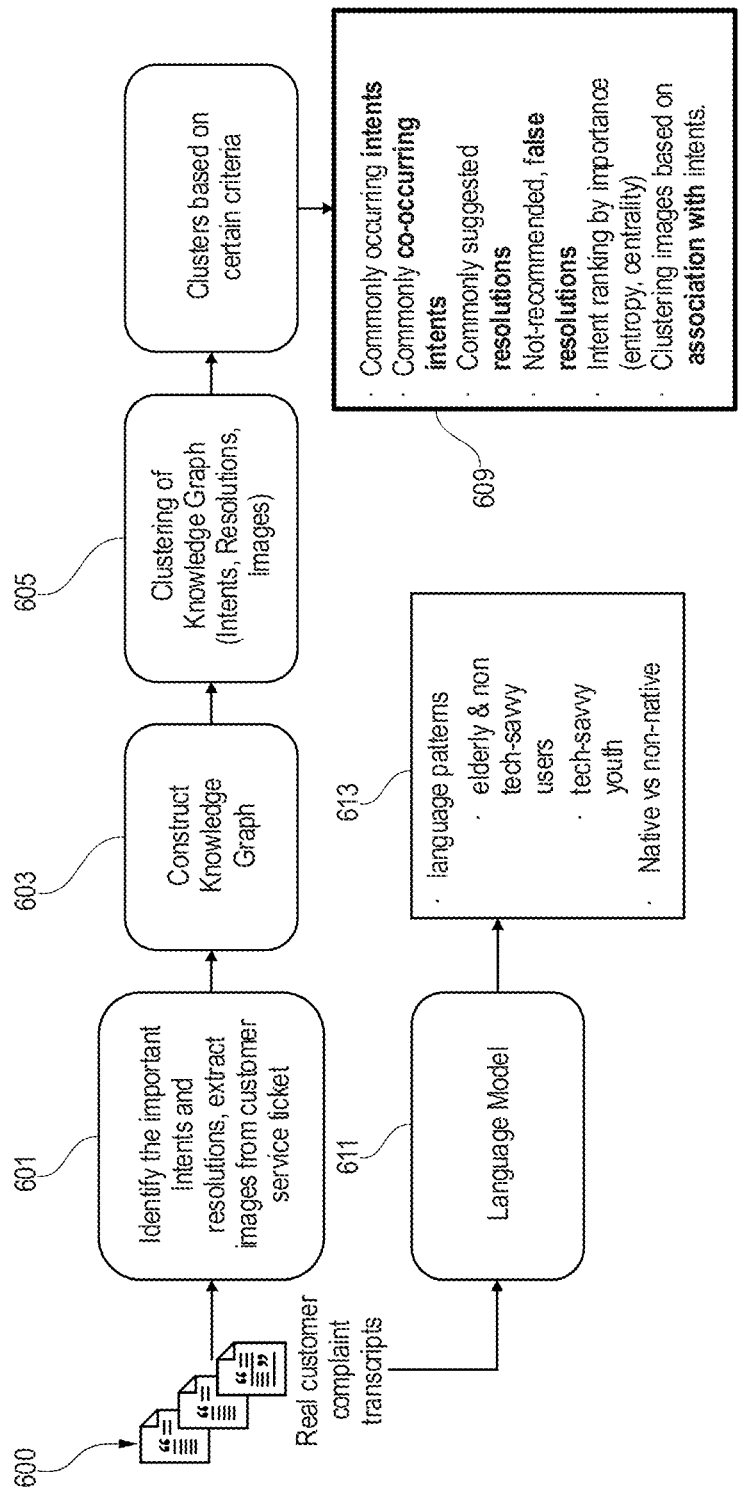
FIG. 6 is a flowchart of a method for creating a knowledge graph and language model in accordance with an example of the present subject matter.

FIG. 6 is a flowchart of a method for creating a knowledge graph and language model in accordance with an example of the present subject matter. The method of FIG. 6 may be performed in a training phase.

In step 601, real customer complaint transcripts 600 may be used to identify the important intents and resolutions and extract images from customer service ticket. A knowledge graph may be constructed in step 603. The knowledge graph may be clustered in step 605 based on criteria 609 as listed in FIG. 6. The criteria may, for example, require that the cluster represents commonly occurring intents, commonly co-occurring intents, commonly suggested resolutions, not recommended or false resolutions etc.

In step 611, a language model may receive as input the real customer complaint transcripts 600 so that it can be trained in step 613 to determine language patterns for different categories of users involved in the real customer complaint transcripts 600.

Figure 7:
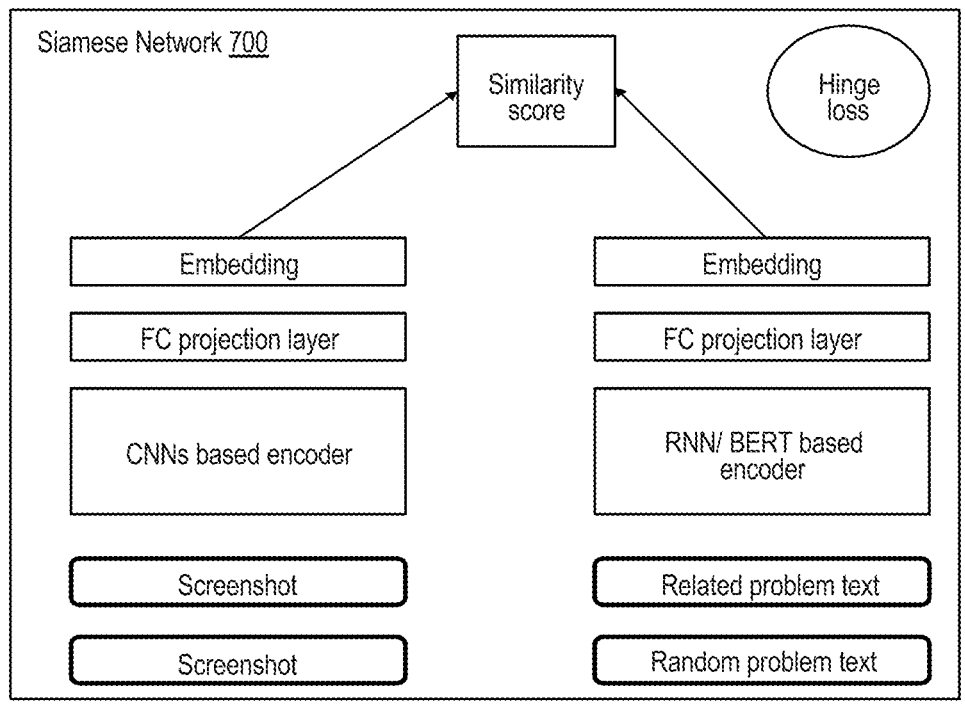
FIG. 7 is a diagram illustrating a method for linking text and image embedding spaces in accordance with the present subject matter.

FIG. 7 is a diagram illustrating a method for linking text and image embedding spaces in accordance with the present subject matter. A Siamese network may be trained for identifying the image and text relationship. The image is analysed using a CNN based encoder whereas textual description is analysed using BERT based transformer. Joint embedding is learnt using hinge loss to align image and text in accordance with a Siamese neural network architecture. The Siamese network is trained on a set of labelled data. The set of labelled data comprises entries. Each entry comprises a triplet consisting of an image (e.g. screenshot), related problem text/random problem text and a label. The label may be set to one if the problem text is not a random one, otherwise the label may be zero.

Figure 8:
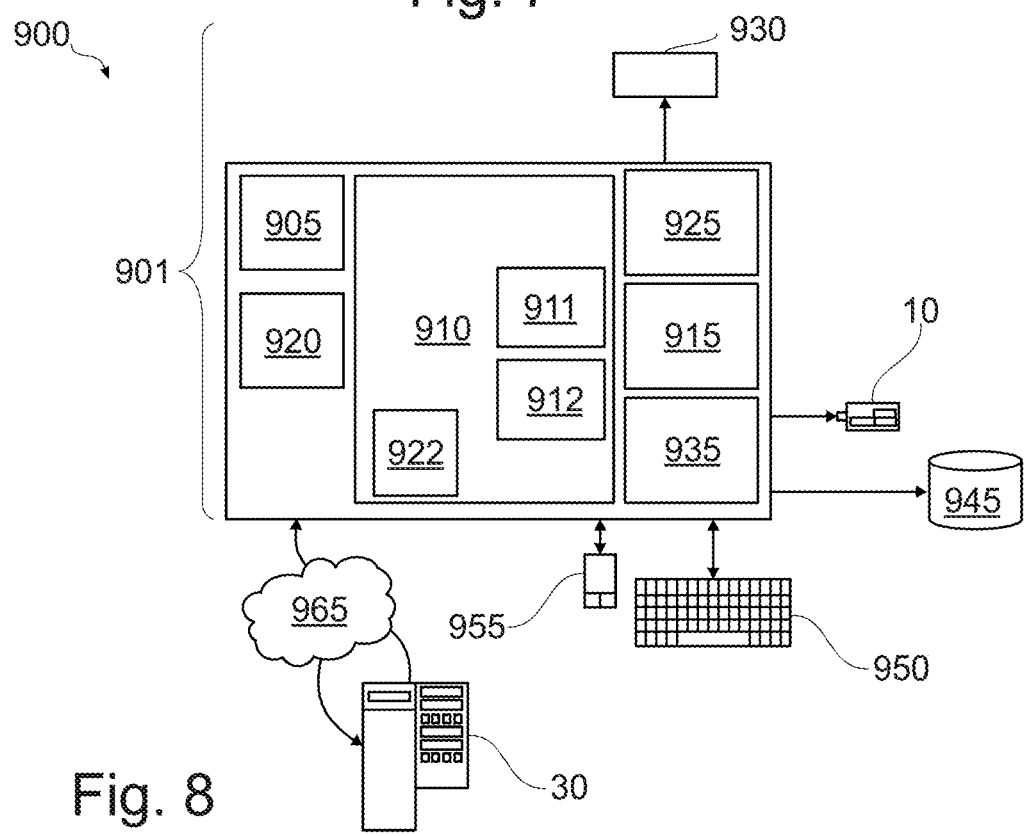
FIG. 8 represents a general computerized system suited for implementing at least part of method steps as involved in the disclosure.

FIG. 8 represents a general computerized system 900 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 912, 922 (including firmware 922), hardware (processor) 905, or a combination thereof. In exemplary embodiments, the methods described herein are implemented in software, as an executable program, and is executed by a special or general-purpose digital computer, such as a personal computer, workstation, minicomputer, or mainframe computer. The most general system 900 therefore includes a general-purpose computer 901.

In exemplary embodiments, in terms of hardware architecture, as shown in FIG. 8, the computer 901 includes a processor 905, memory (main memory) 910 coupled to a memory controller 915, and one or more input and/or output (I/O) devices (or peripherals) 10, 945 that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 945 may generally include any generalized cryptographic card or smart card known in the art.

The processor 905 is a hardware device for executing software, particularly that stored in memory 910. The processor 905 can be any custom made or commercially available processor, a central processing unit (CPU), an auxiliary processor among several processors associated with the computer 901, a semiconductor-based microprocessor (in the form of a microchip or chip set), or generally any device for executing software instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 910 can have a distributed architecture, where various components are situated remote from one another, but can be accessed by the processor 905.

The software in memory 910 may include one or more separate programs, each of which comprises an ordered listing of executable instructions for implementing logical functions, notably functions involved in embodiments of this invention. In the example of FIG. 8, software in the memory 910 includes instructions 912 e.g. instructions to manage databases such as a database management system.

The software in memory 910 shall also typically include a suitable operating system (OS) 911. The OS 911 essentially controls the execution of other computer programs, such as possibly software 912 for implementing methods as described herein.

The methods described herein may be in the form of a source program 912, executable program 912 (object code), script, or any other entity comprising a set of instructions 912 to be performed. When a source program, then the program needs to be translated via a compiler, assembler, interpreter, or the like, which may or may not be included within the memory 910, so as to operate properly in connection with the OS 911. Furthermore, the methods can be written as an object-oriented programming language, which has classes of data and methods, or a procedure programming language, which has routines, subroutines, and/or functions.

In exemplary embodiments, a conventional keyboard 950 and mouse 955 can be coupled to the input/output controller 935. Other output devices such as the I/O devices 945 may include input devices, for example but not limited to a printer, a scanner, microphone, and the like. Finally, the I/O devices 10, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 945 can be any generalized cryptographic card or smart card known in the art. The system 900 can further include a display controller 925 coupled to a display 930. In exemplary embodiments, the system 900 can further include a network interface for coupling to a network 965. The network 965 can be an IP-based network for communication between the computer 901 and any external server, client and the like via a broadband connection. The network 965 transmits and receives data between the computer 901 and external systems 30, which can be involved to perform part, or all of the steps of the methods discussed herein. In exemplary embodiments, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 901 is a PC, workstation, intelligent device or the like, the software in the memory 910 may further include a basic input output system (BIOS) 922. The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute software 912 stored within the memory 910, to communicate data to and from the memory 910, and to generally control operations of the computer 901 pursuant to the software. The methods described herein and the OS 911, in whole or in part, but typically the latter, are read by the processor 905, possibly buffered within the processor 905, and then executed.

When the systems and methods described herein are implemented in software 912, as is shown in FIG. 8, the methods can be stored on any computer readable medium, such as storage 920, for use by or in connection with any computer related system or method. The storage 920 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for electronic messaging, comprising:
   receiving an electronic message of an electronic communication system;
   configuring a value of a parameter k in accordance with a desired noise level of a noisy content;
   determining, using a knowledge base, message intents of the received electronic message and one or more related intents;
   determining, using the electronic message a context of a messaging session, the context of the messaging session being defined by at least a subgraph of a knowledge graph comprised in the knowledge base, wherein the knowledge graph represents a domain of computer related bugs fixing, using the subgraph for the determining the one or more related intents such that a generated electronic message comprises the noisy content that is different from a content of the received electronic message and that belongs to the determined context;
   generating the generated electronic message according to a selected subset of the message intents or according to the one or more related intents;
   selecting the subset of the message intents based on centrality indices of the knowledge graph comprised in the knowledge base, or based on scores of the message intents obtained from an intent classifier, the selecting being performed such that the subset of message intents comprises K less important message intents, where K is a predefined number; and
   controlling the electronic communication system to provide the generated electronic message instead of the received electronic message or provide the generated electronic message in addition to the received electronic message.

2. The method of claim 1, wherein the electronic message is intercepted from a chat application of the electronic communication system, the chat application being configured to simulate a conversation with a user during the messaging session, the receiving comprising: intercepting the electronic message of the chat application at predefined points of time of the messaging session.

3. The method of claim 1, wherein the electronic communication system is a chat server that is configured to distribute messages between chat clients.

4. The method of claim 3, wherein the electronic message is received from a first chat client in destination to a second chat client, the method further comprising detecting sensitive information in the received electronic message wherein the selected subset of the message intents comprises non-sensitive information, wherein the generated electronic message is provided instead of the received electronic message.

5. The method of claim 1, wherein the related intents are intents of the knowledge graph comprised in the knowledge base which are within k-hops neighbourhood of the message intents, wherein k is a value of a configurable parameter.

6. The method of claim 1, wherein generating the electronic message according to the related intents comprises: applying a language model on the related intents for generating the electronic message.

7. The method of claim 6, further comprising training the language model per persona of a user involved in the communication with the electronic communication system in order to mimic a user specific language.

8. The method of claim 1, wherein generating the electronic message according to the selected subset of intents comprises removing fragments of the received electronic message that represent the subset of intents, thereby generating the electronic message.

9. The method of claim 1, further comprising representing the received electronic message in a predefined vector space, wherein the subset of intents is selected and the related intents are determined such that the generated electronic message is within a minimum distance from the received electronic message in the vector space.

10. The method of claim 1, the knowledge base comprising the knowledge graph, the method further comprising:
creating the knowledge graph using communication transcripts and/or logs of previous data communications;
clustering intents of the knowledge graph according to one or more graph properties of the knowledge graph, the graph property comprising any one of: a centrality index of each node of the graph and a distance of each node to other nodes of the graph.

11. A computer program product comprising one or more computer-readable storage media having computer-readable program instructions embodied therewith for execution by one or more processors of one or more computers, the computer-readable program instructions comprising instructions for:
receiving, by the one or more computers, an electronic message of an electronic communication system;
determining, by the one or more computers, using a knowledge base, message intents of the received electronic message and one or more related intents;
determining, by the one or more processors, using the electronic message a context of a messaging session, wherein the context of the messaging session being defined by at least a subgraph of a knowledge graph comprised in the knowledge base, using the subgraph for the determining of the one or more related intents such that a generated electronic message comprises a noisy content that is different from a content of the received electronic message and that belongs to the determined context;
generating, by the one or more computers, the generated electronic message according to a selected subset of the message intents or according to the one or more related intents; and
controlling the electronic communication system to provide the generated electronic message instead of the received electronic message or provide the generated electronic message in addition to the received electronic message.

12. The computer program product of claim 11, wherein the electronic message is intercepted from a chat application of the electronic communication system, the chat application being configured to simulate a conversation with a user during the messaging session, the receiving comprising: intercepting the electronic message of the chat application at predefined points of time of the messaging session.

13. A computer system comprising one or more processors and one or more tangible storage media storing programming instructions for execution by the one or more processors, the program instructions comprising instructions for:
receiving an electronic message;
determining, using a knowledge base, message intents of the received electronic message and one or more related intents;
determining, using the electronic message a context of a messaging session, the context of the messaging session being defined by at least a subgraph of a knowledge graph comprised in the knowledge base, using the subgraph for the determining of the one or more related intents such that a generated electronic message comprises a noisy content that is different from a content of the received electronic message and that belongs to the determined context;
generating the generated electronic message according to a selected subset of the message intents or according to the one or more related intents; and
providing the generated electronic message instead of the received electronic message or provide the generated electronic message in addition to the received electronic message.

14. The computer system of claim 13, wherein the electronic message is intercepted from a chat application of an electronic communication system, the chat application being configured to simulate a conversation with a user during the messaging session, the receiving comprising: intercepting the electronic message of the chat application at predefined points of time of the messaging session.

* * * * *